United States Patent
Rai

(10) Patent No.: US 7,159,034 B1
(45) Date of Patent: Jan. 2, 2007

(54) SYSTEM BROADCASTING ARP REQUEST FROM A SERVER USING A DIFFERENT IP ADDRESS TO BALANCE INCOMING TRAFFIC LOAD FROM CLIENTS VIA DIFFERENT NETWORK INTERFACE CARDS

(75) Inventor: Piyush Rai, Uttar Pradesh (IN)

(73) Assignee: Novell, Inc., Provo, UT (US)

( * ) Notice: Subject to any disclaimer, the term of this patent is extended or adjusted under 35 U.S.C. 154(b) by 884 days.

(21) Appl. No.: 10/378,222

(22) Filed: Mar. 3, 2003

(51) Int. Cl.
*G06F 15/173* (2006.01)

(52) U.S. Cl. .................................. 709/238; 709/239

(58) Field of Classification Search ............... 709/238, 709/239, 223; 370/218, 395.53, 389, 352, 370/223, 465
See application file for complete search history.

(56) References Cited

U.S. PATENT DOCUMENTS

| | | | |
|---|---|---|---|
| 5,864,535 A | 1/1999 | Basilico | |
| 6,178,160 B1 | 1/2001 | Bolton et al. | |
| 6,185,601 B1 | 2/2001 | Wolff | |
| 6,243,360 B1 | 6/2001 | Basilico | |
| 6,697,326 B1* | 2/2004 | Britton et al. | 370/218 |
| 7,042,876 B1* | 5/2006 | Jayasenan et al. | 370/389 |
| 7,046,679 B1* | 5/2006 | Sampath et al. | 370/395.53 |
| 7,072,337 B1* | 7/2006 | Arutyunov et al. | 370/389 |
| 2002/0021689 A1* | 2/2002 | Robbins et al. | 370/352 |
| 2002/0052942 A1* | 5/2002 | Swildens et al. | 709/223 |
| 2002/0167965 A1* | 11/2002 | Beasley et al. | 370/465 |

* cited by examiner

*Primary Examiner*—Le Hien Luu
(74) *Attorney, Agent, or Firm*—Haynes and Boone, LLP

(57) ABSTRACT

A method and system are provided for maintaining a load balance of incoming traffic on a server after the server broadcasts an address request, such as an Address Resolution Protocol (ARP) request for an network address. The method includes informing each client of a hardware address to use in communicating with the server. The hardware address is associated with a first network address. Different clients may be assigned different hardware addresses to balance the server's incoming traffic. The server stores client addresses that expire after a period of time has elapsed. When an address expires, the server broadcasts an address request using a second network address. Because the network address used for the broadcast address request does not match the network address assigned to the clients, the clients will continue using the originally assigned hardware addresses instead of switching to the hardware address used to send the broadcast request.

24 Claims, 8 Drawing Sheets

SYSTEM BROADCASTING ARP REQUEST FROM A SERVER USING A DIFFERENT IP ADDRESS TO BALANCE INCOMING TRAFFIC LOAD FROM CLIENTS VIA DIFFERENT NETWORK INTERFACE CARDS

BACKGROUND

This disclosure relates generally to load balancing in digital systems and, more specifically, to a method and system for load balancing at a network interface card level.

A computer network generally has at least one computer (e.g., a server or gateway) that provides services to other computers (clients) via a network. In an Internet Protocol (IP) network, the server and clients are associated with IP addresses that enable the other computers to send them packets. Address resolution between the server and clients may use an Address Resolution Protocol (ARP), which maps an IP address to a physical machine address.

The server and clients each have at least one network interface card (NIC) or a similar interface through which the incoming (inbound) and outgoing (outbound) traffic is routed. Each NIC has a unique hardware number called a Media Access Control (MAC) address (e.g., a physical machine address) that may be used in conjunction with the IP address to identify a specific communication route to be used for a computer. For example, a server may have multiple NICs and may use a load balancing module to distribute the traffic between the NICs by assigning different communication routes to different clients.

One form of load balancing in an IP network is link level load balancing, which can be achieved on a network by replicating links of the server. Each link provides a connection point or path to the server that may be used for traffic to and from a client. Generally, a server with link level load balancing has multiple NICs on which the inbound and outbound traffic will be distributed, where each NIC serves as a link. When a client sends an ARP request for the server's IP address, the load balancing module on the server responds with a MAC address of one of the NICs, which identifies the specific link to be used. The design of the load balancing module determines which NIC and associated MAC address is selected.

To implement such link level load balancing, the server and clients may each have an ARP cache that is used to maintain entries of each IP-MAC mapping (e.g., the association between each IP and MAC address) belonging to the other computers. The lifetime of each entry is configurable, so each entry may remain valid for a certain period of time before expiring. When an entry in a cache expires, the computer associated with the cache sends an ARP request across the network for the IP address associated with the MAC address of the expired entry. Upon receiving a reply from the computer having the MAC address, ARP updates the cache.

Another way to update the IP-MAC information uses an ARP request and Gratuitous ARP, which involves sending broadcast packets that are received by every computer. On receiving the ARP broadcast request, ARP searches each computer's ARP cache for the source IP address and, upon finding a match, updates the entry with the MAC present in the ARP packet. Therefore, when the server broadcasts the ARP request, all the clients update their ARP cache for the server IP address with the MAC address used by the server in sending the ARP. Accordingly, after every broadcast ARP request generated by the server, the inbound load balancing may be disrupted as all the clients may attempt to communicate with the server via the single NIC used for the broadcast. This results in poor throughput and congestion at the NIC.

Therefore, what is needed is an improved method and system for maintaining load balancing in a computer network. For example, it is desirable that a broadcast ARP request from a server does not cause all clients to update their ARP caches to a single NIC on the server.

SUMMARY

In response to these and other problems, a method and system is provided for balancing an incoming traffic load on a server that uses an address resolution protocol (ARP) for address resolution with first and second clients. The server includes at least first and second links, and is associated with first and second internet protocol (IP) addresses. The server communicates with the first client via the first link and first IP address, and communicates with the second client via the second link and first IP address. The method comprises determining that a third IP address has expired on the server, where the third IP address is associated with the first client. An ARP request is broadcast by the server for the first client via the second IP address. The second client continues to send packets to the server via the first IP address and second link after receiving the broadcast ARP request, because the second client does not relate the second IP address with the server.

DETAILED DESCRIPTION

Figure 1:
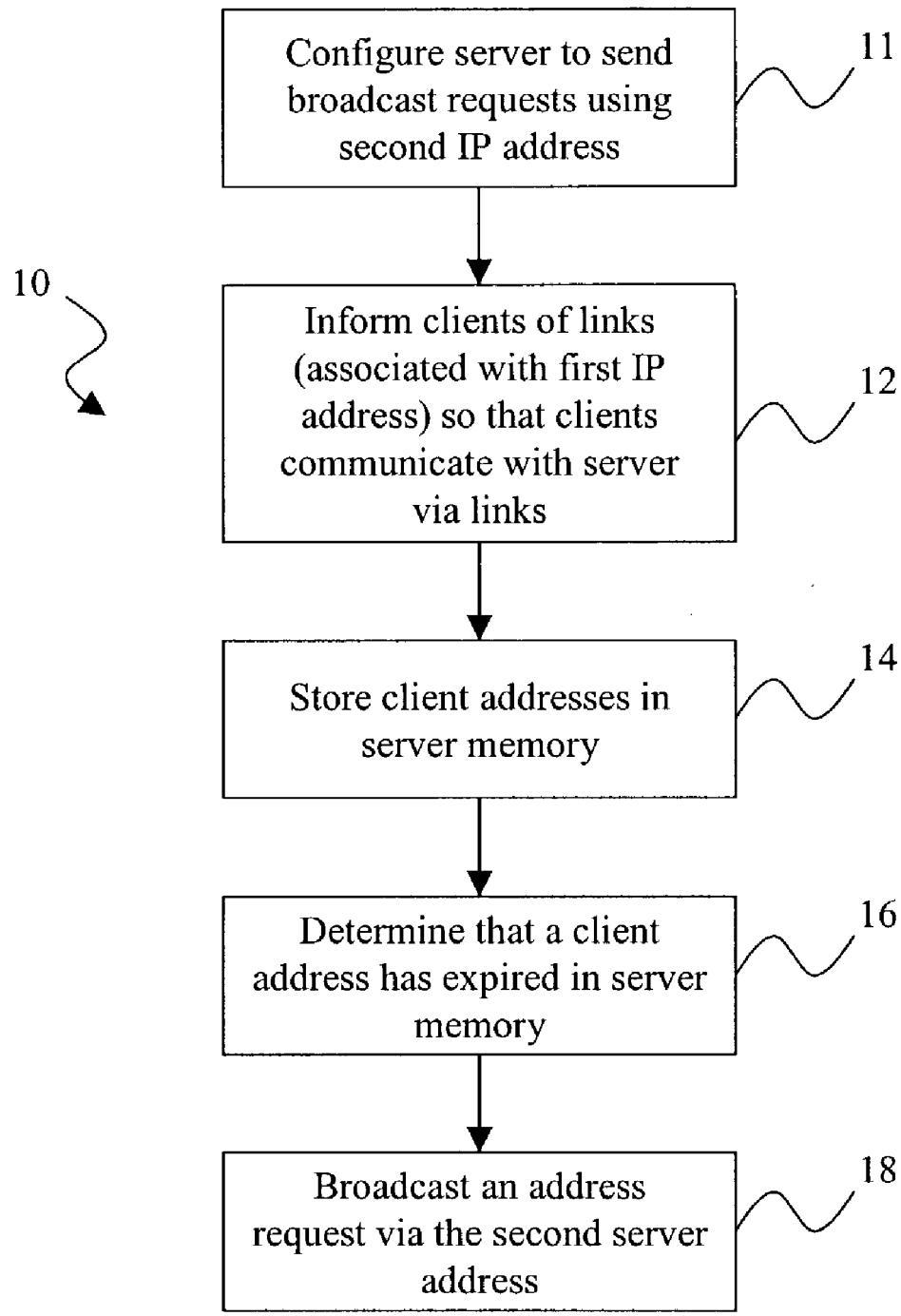
FIG. 1 is a flowchart illustrating a method for maintaining an incoming traffic load balance after broadcasting an address request.

This disclosure relates generally to load balancing in digital systems and, more specifically, to a method and system for load balancing at a network interface card level. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a method 10 enables a network computer, such as a server, to update client addresses while maintaining an inbound traffic load balance. As will be described later in greater detail, the server is associated with first and second server addresses (e.g., Internet Protocol (IP) addresses), and the first address identifies the server to other computers (e.g., clients) on the network. Each client is also associated with an address, such as an IP address. The server and each client also include unique identifiers that are tied, for example, to hardware components (e.g., network interface cards (NICs)) within the associated computer. In the present example, the server has two NICs, one of which is associated with a first identifier and the other of which is associated with a second identifier. Both of the NICs (and their respective identifiers) are associated with the first server IP address. The server distributes clients between the two NICs during load balancing.

The server and clients also have storage means (e.g., memory) for storing entries containing the address and identifier that is to be used to send messages to each computer. In the present example, an address resolution protocol (ARP) is used to resolve addresses between the server and clients, and each ARP entry may expire after a predefined amount of time has elapsed. The client memory includes a server entry (e.g., the first server address and one of the identifiers) and, when the client receives an ARP broadcast address request from the server, the client will check the stored entry. If the broadcast request (which includes one of the server addresses and one of the server identifiers) matches the server address stored in the client's entry, the client will update the entry with the new identifier from the broadcast request. For example, a client that has an entry containing the first server address and first identifier would, upon receiving a broadcast request using the first server address and second identifier, update its entry to contain the second identifier. For this reason, a broadcast request sent from the first server address (e.g., the address used to communicate with the clients) will cause all clients to update their entries with the first identifier, which directs all traffic to the associated component and negatively impacts load balancing in the server.

The method 10 avoids such load balancing issues as follows. In step 11, the server is configured to send ARP broadcast requests using the second server IP address. In step 12, the server informs clients that they are to send packets to the server using one of the unique identifiers (which are both associated with the first server IP address). For example, one client may be instructed to use the first identifier, while another client may be instructed to use the second identifier. In step 14, the client address/identifier combinations are stored in the server memory. After a period of time has elapsed, it is determined that at least one of the client addresses has expired in step 16. It is understood that this may be an ongoing process where client addresses are constantly being added and/or are expiring.

In response to the expiration of the client address, the server broadcasts an address request on the network via the second server address in step 18. As the second server address does not match the first server address stored in the clients' memory, the clients will not update their entries with the address/identifier combination in the broadcast request. Accordingly, the distribution of traffic between the components associated with the two identifiers will remain intact.

Figure 2:
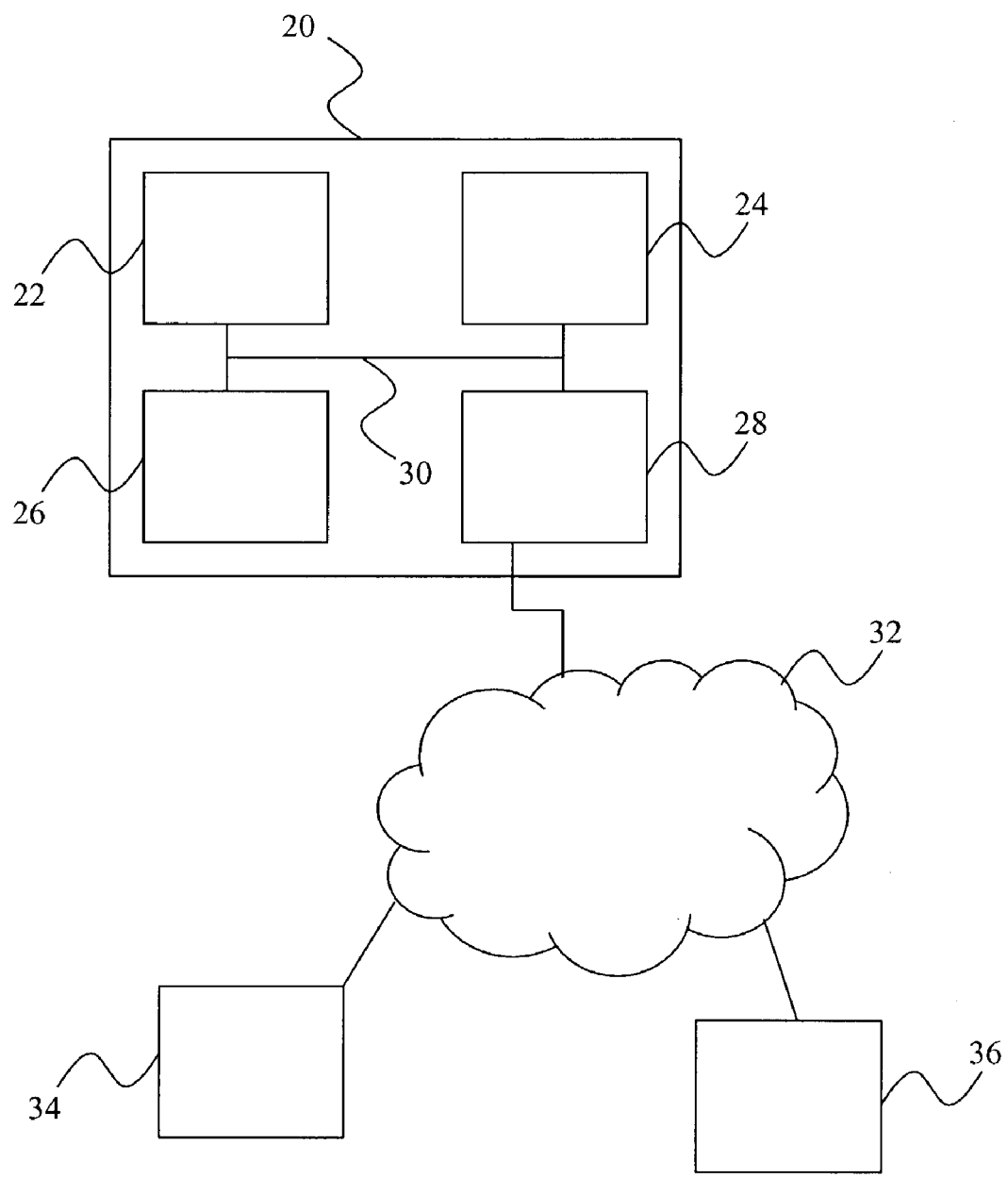
FIG. 2 is a diagram of an exemplary computer and network environment in which the method of FIG. 1 may be executed.

Referring now to FIG. 2, in another embodiment, an exemplary computer 20, such as may be used to implement the method 10 of FIG. 1, is illustrated. The computer 20 may include a central processing unit ("CPU") 22, a memory unit 24, an input/output ("I/O") device 26, and a network interface 28. The network interface may be, for example, a network interface card (NIC) that is associated with a media access control (MAC) address. The components 22, 24, 26, and 28 are interconnected by a bus system 30. It is understood that the computer may be differently configured and that each of the listed components may actually represent several different components. For example, the CPU 22 may actually represent a multi-processor or a distributed processing system; the memory unit 24 may include different levels of cache memory, main memory, hard disks, and remote storage locations; the I/O device 26 may include monitors, keyboards, and the like; and the network interface 28 may include multiple NICs or similar components.

The computer 20 may be connected to a network 32. The network 32 may be, for example, a subnet of a local area network, a company wide intranet, and/or the Internet. Because the computer 20 may be connected to the network 32, certain components may, at times, be shared with other computers 34, 36. Therefore, a wide range of flexibility is anticipated in the configuration of the computer. Furthermore, it is understood that, in some implementations, the computer 20 may act as a server to other computers 34, 36. Each computer 20, 34, 36 is identified on the network by an address (e.g., an IP address) and, in some instances, by the MAC address associated with the network interface 28 of the relevant computer. In the present example, the computers 20, 34, and 36 each have a cache (represented as a table in the following text) that stores the IP address and MAC address of other computers.

Figure 3:
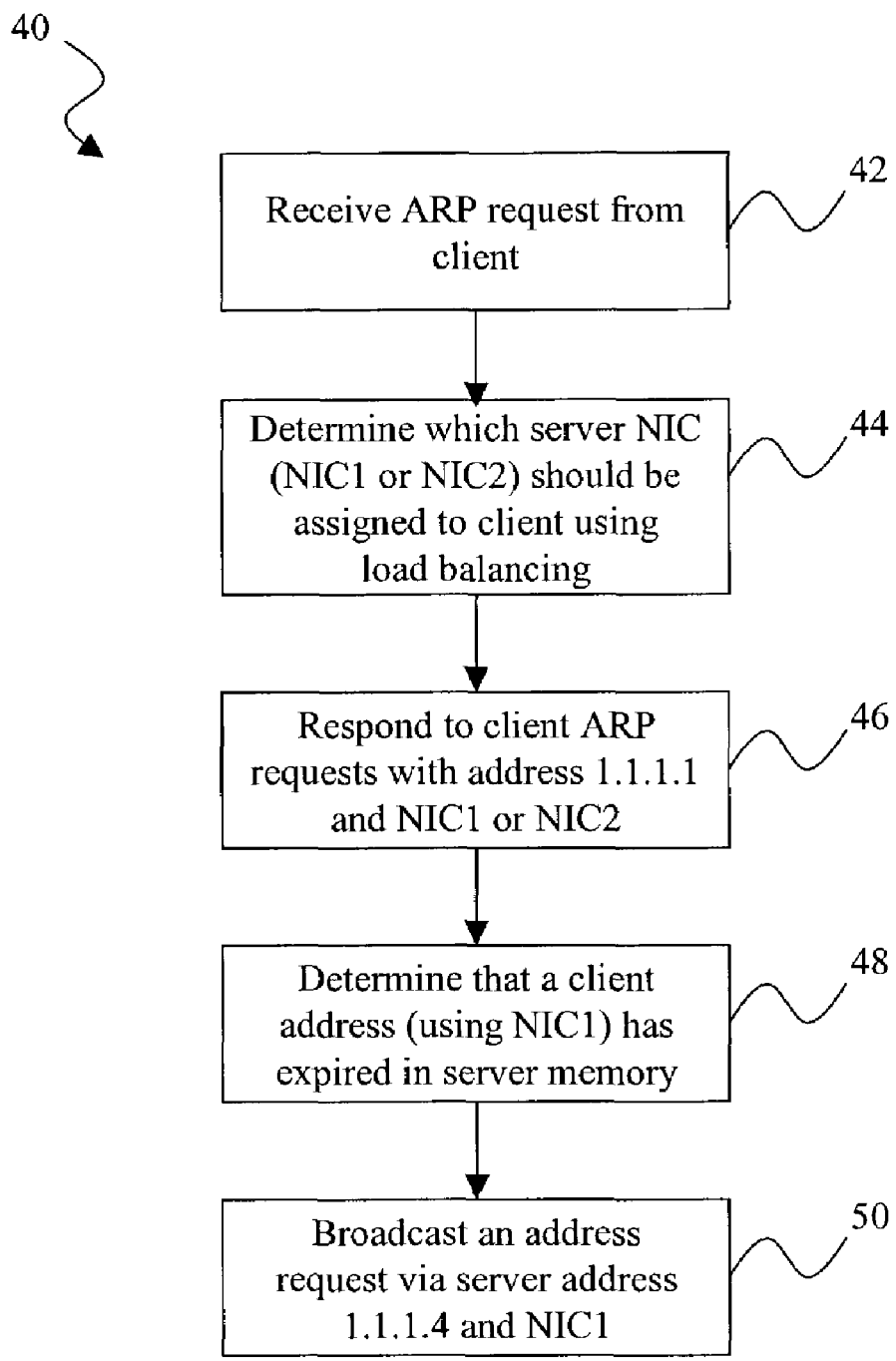
FIG. 3 is a flowchart illustrating another embodiment of a method for maintaining an incoming traffic load balance after broadcasting an address request on the network of FIG. 2.

Referring now to FIG. 3 and with additional reference to FIGS. 4–8, in still another embodiment, a method 40 may balance an incoming traffic load received by the computer 20 of FIG. 2 from the network 32 (and other computers 34, 36) after an address request is broadcasted. In the present example, the computer 20 of FIG. 2 is illustrated as a server in the IP network 32. The server 20 has two NICs, which have MAC addresses identified as NIC1 and NIC2, respectively. The server's IP address is 1.1.1.1 and both the NICs are bound to it. The computers 34, 36 are located on the same portion of the network (e.g., subnet) and are clients of the server 20. Each client 34, 36 has one NIC. The client 34's IP address is 1.1.1.2 and its MAC address is NIC3. The client 36's IP address is 1.1.1.3 and its MAC address is NIC4. In the present example, the computers 20, 34, 36 use ARP requests to determine the addresses of other computers on the network 32.

Figure 4:
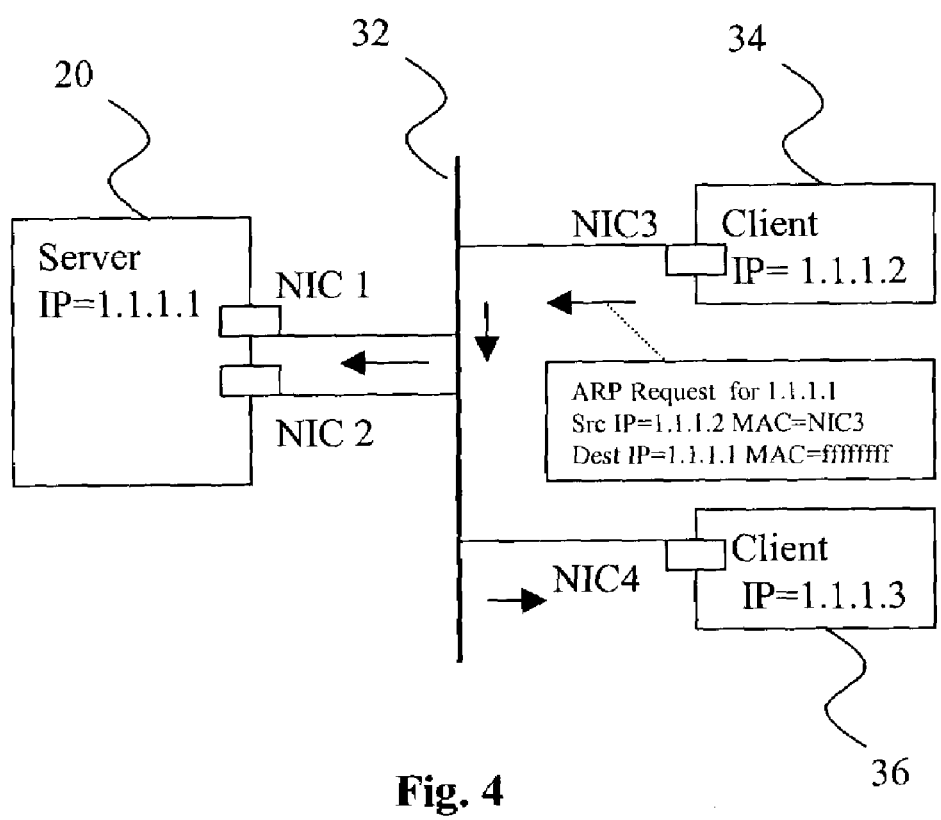
FIGS. 4–7 illustrate exemplary data flows following address requests using the network of FIG. 2.
Figure 5:
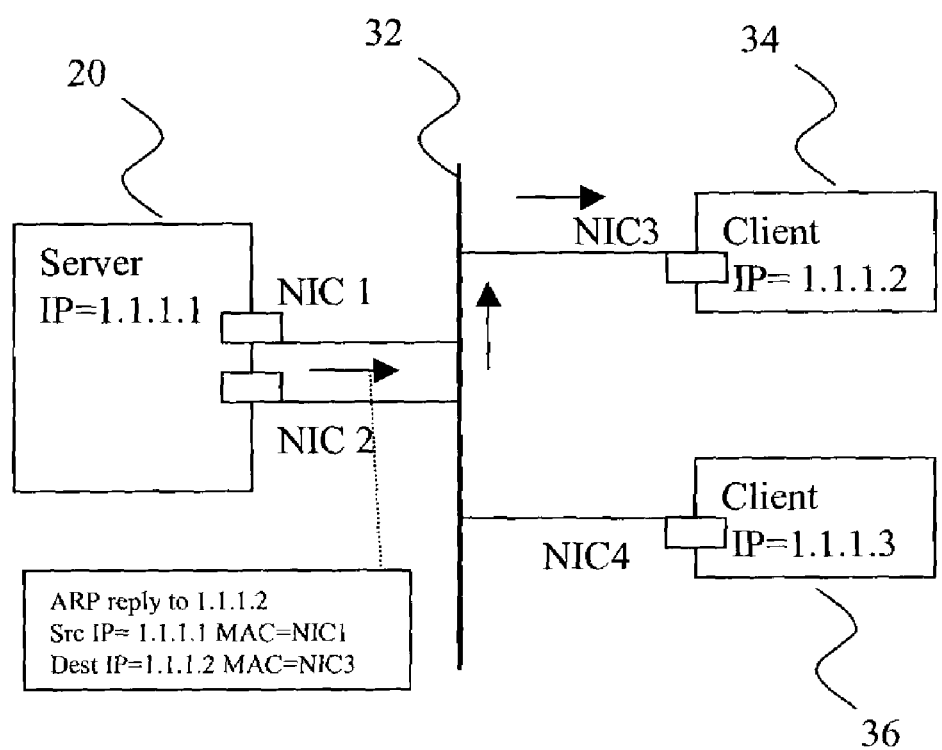

Referring particularly to FIGS. 4 and 5, as well as step 42 of FIG. 3, the client 34 initiates communications with the server 20 at time t0 by sending an ARP request for IP address 1.1.1.1 (e.g., the server 20's IP address). The ARP request is to return a MAC address associated with the IP address 1.1.1.1. In step 44, an inbound load balancing process on the server 20 determines whether to select NIC1 or NIC2 from the available NICs. In the present example, NIC1 is selected and the server 20 replies to the ARP request with NIC1 in step 46. The client 34 may now send packets to the server 20 via IP address 1.1.1.1 and NIC1. Following these steps, the client 34's ARP table at time t0 appears as follows in Table 1.

TABLE 1

| (Client 34) | | | |
|---|---|---|---|
| IP Address | MAC Address | Lifetime | Status |
| 1.1.1.1 | NIC1 | T1 | Valid |

T1 is the lifetime of the ARP entry in the client 34's ARP cache, so the entry will expire when T1 has elapsed.

The server 20 uses information contained in the client 34's ARP request to obtain the MAC address of the client 34. Accordingly, the server 20's ARP table at time t0 appears as follows in Table 2.

TABLE 2

(Server 20)

| IP Address | MAC Address | Lifetime | Status |
|---|---|---|---|
| 1.1.1.2 | NIC3 | Dt1 | Valid |

Dt1 is the lifetime for the ARP entry on the server 20.

Figure 6:
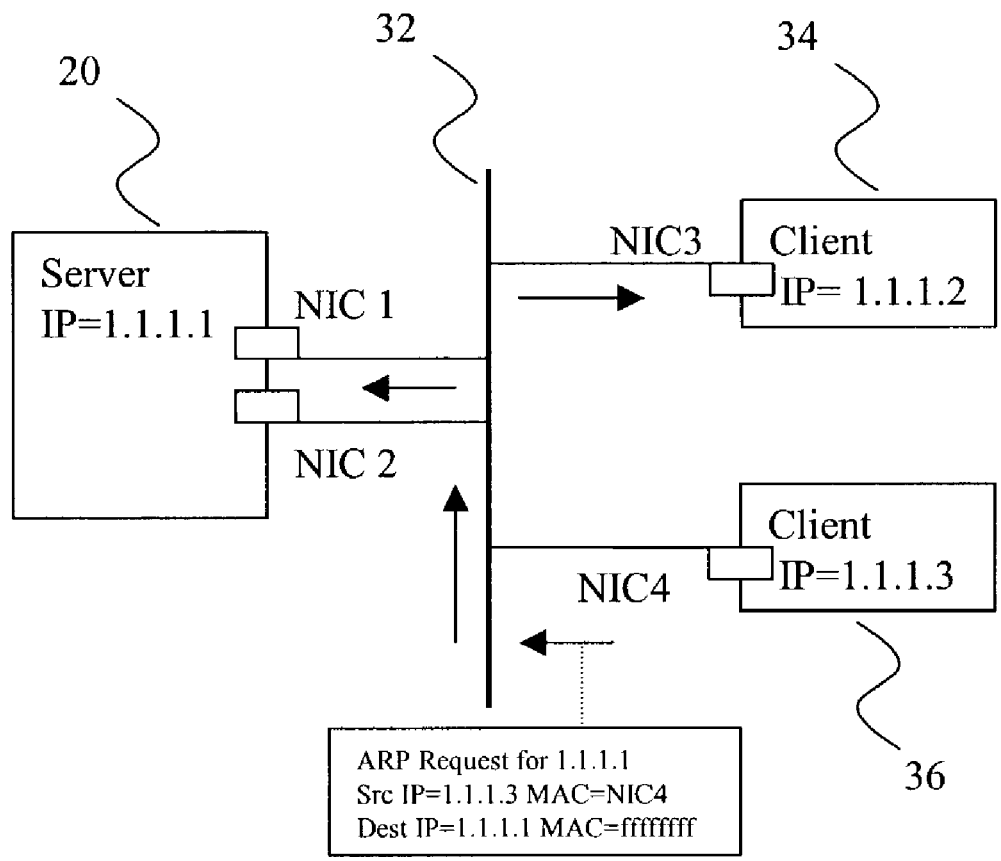
Figure 7:
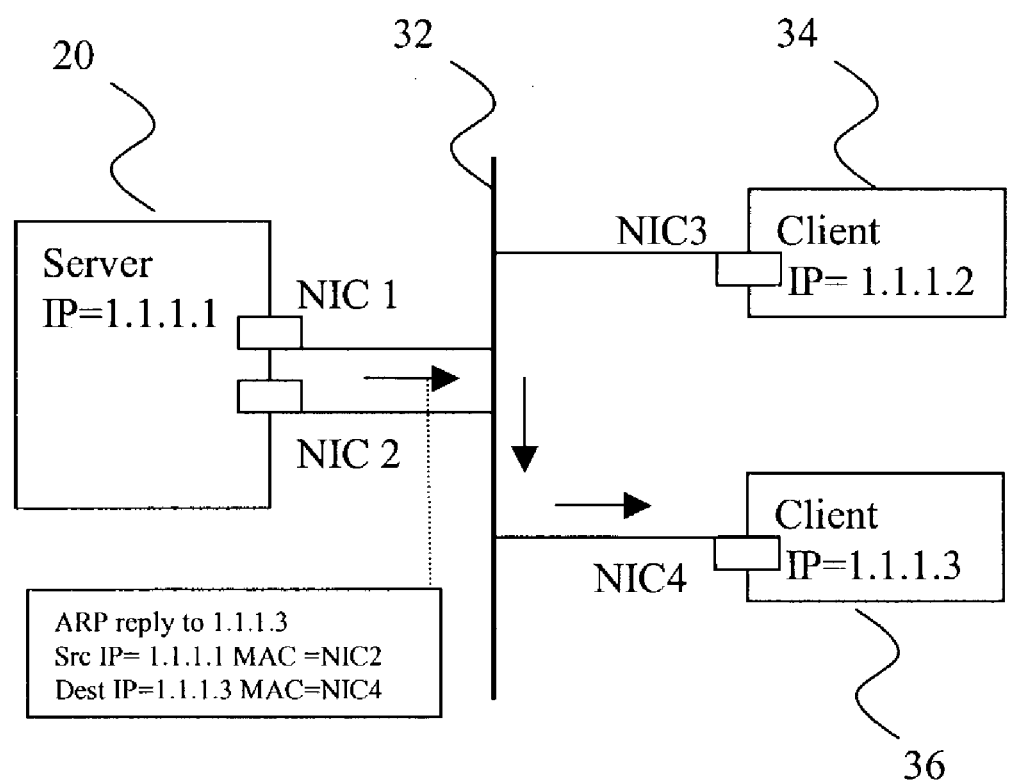

Repeating steps 42–46 of FIG. 3 and referring also to FIGS. 6 and 7, the client 36 sends an ARP request for the server 20 at time t0+Dt, as described previously. For the client 36, the inbound load balancing process assigns NIC2 as the MAC address for 1.1.1.1. Accordingly, at time t0+Dt, the ARP Tables of the client 34, the server 20, and the client 36 appear as follows in Table 3–5, respectively.

TABLE 3

(Client 34)

| IP Address | MAC Address | Lifetime | Status |
|---|---|---|---|
| 1.1.1.1 | NIC1 | T1 − Dt | Valid |

TABLE 4

(Server 20)

| IP Address | MAC Address | Lifetime | Status |
|---|---|---|---|
| 1.1.1.2 | NIC3 | Dt1 − Dt | Valid |
| 1.1.1.3 | NIC4 | Dt1 | Valid |

TABLE 5

(Client 36)

| IP Address | MAC Address | Lifetime | Status |
|---|---|---|---|
| 1.1.1.1 | NIC2 | T2 | Valid |

T2 is the lifetime of the ARP entry on the client 36.

As can be clearly seen in Tables 3 and 5; the clients 34, 36 are assigned different MAC addresses for the server 20. Accordingly, the inbound traffic on the server 20 is distributed between NIC1 and NIC2.

As described previously, the ARP table entries are each associated with an expiration period. Continuing the present example, as the lifetime of the ARP entry for the client 34 on the server on 20 is Dt1, then the ARP tables will appear as follows at time t0+Dt1.

TABLE 6

(Client 34)

| IP Address | MAC Address | Lifetime | Status |
|---|---|---|---|
| 1.1.1.1 | NIC1 | T1 − Dt1 | Valid |

TABLE 7

(Server 20)

| IP Address | MAC Address | Lifetime | Status |
|---|---|---|---|
| 1.1.1.2 | NIC3 | 0 | Invalid |
| 1.1.1.3 | NIC4 | Dt | Valid |

TABLE 8

(Client 36)

| IP Address | MAC Address | Lifetime | Status |
|---|---|---|---|
| 1.1.1.1 | NIC2 | T2 − Dt1 + Dt | Valid |

The preceding Tables 6–8 assume that Dt1 is less than T1 and T2. If not, the lifetime may have a different value, but the underlying problem (described below) will remain.

In step 48 of FIG. 3, it is determined that the server ARP table entry for the client 34 is invalid. When this occurs, the server 20 broadcasts an ARP request for the address 1.1.1.2. If the server 20 broadcasts the request using the IP address 1.1.1.1 and NIC1 (e.g., the same NIC used to communicate with the client 34), the client 36 will compare the source IP of the broadcast with its ARP cache. Because the IP address 1.1.1.1 matches an ARP cache entry, the client 36 will update the MAC address for the server 20 in its ARP table from NIC2 to NIC1 (e.g., the source MAC address used in the request). Accordingly, the ARP tables of the clients 34, 36 will appear as shown in Tables 9 and 10.

TABLE 9

(Client 34)

| IP Address | MAC Address | Lifetime | Status |
|---|---|---|---|
| 1.1.1.1 | NIC1 | T1 | Valid |

TABLE 10

(Client 36)

| IP Address | MAC Address | Lifetime | Status |
|---|---|---|---|
| 1.1.1.1 | NIC1 | T2 | Valid |

Both clients 34, 36 now have the same MAC address (NIC1) for the IP address 1.1.1.1, and the inbound traffic on the server 20 will be received only through NIC1. It is noted that, while the preceding example focuses on a case where the ARP entry on the server is expired, a similar issue may arise when the server 20 initiates a connection with another computer. The server 20 would send a broadcast request for the computer's MAC address, which would cause all the clients to update the ARP entry associated with the server 20 with the source MAC address used in the ARP request.

Possible approaches to correct this disruption of load balancing following a broadcast request include changing the ARP process, creating static ARP entries in the client for the server, and configuring the ARP entry lifetime. However, these approaches require changing either the clients or the ARP process, neither of which is desirable.

The first approach (e.g., changing the ARP process) includes, for example, modifying ARP so that the ARP table is not updated when ARP request packets are received. However, this approach requires support of stack vendors and requires that all the machines on the network be upgraded to the latest stack. Furthermore, the ARP traffic will increase as the various ARP tables will not be updated with an ARP request. Accordingly, each computer will generate an ARP request after expiration of the ARP entries. In addition, the problem to be addressed affects servers with multiple interfaces, and this approach would impact ARP implementations of single interface servers and clients.

The second approach (e.g., creating static ARP entries in the client for the server) does not offer fault tolerance (e.g., dynamic failover is not possible). This means that if one of the server interfaces is not working, then the static ARP entries on each client using that interface will need to be changed manually. If not changed, the clients will be unable to contact the server, even though the server is accessible via other interfaces. In addition, the advantages provided by load balancing will be lost.

The third approach (e.g., configuring the ARP entry lifetime) involves increasing or decreasing the entry lifetimes. Increasing the lifetimes enables the number of ARP requests generated by the server to be reduced, which reduces the probability of the client's ARP table getting overwritten by the ARP requests of the server. Decreasing the lifetimes means that, if the clients' caches are overwritten by the ARP request of the server, the entries will expire soon and clients will get the new MAC address of the server allotted by the load balancing module. Upon receiving the clients' ARP requests, the server will update its cache with the MAC addresses of the clients and the lifetime will be reset to the maximum. However, there is a possibility that the server may initiate a connection with some other client and cause the client's ARP cache to be updated with an undesired MAC of the server. In addition, controlling the client's ARP entry lifetime may not benefit server-to-server communication. This approach may also result in more ARP traffic.

Figure 8:
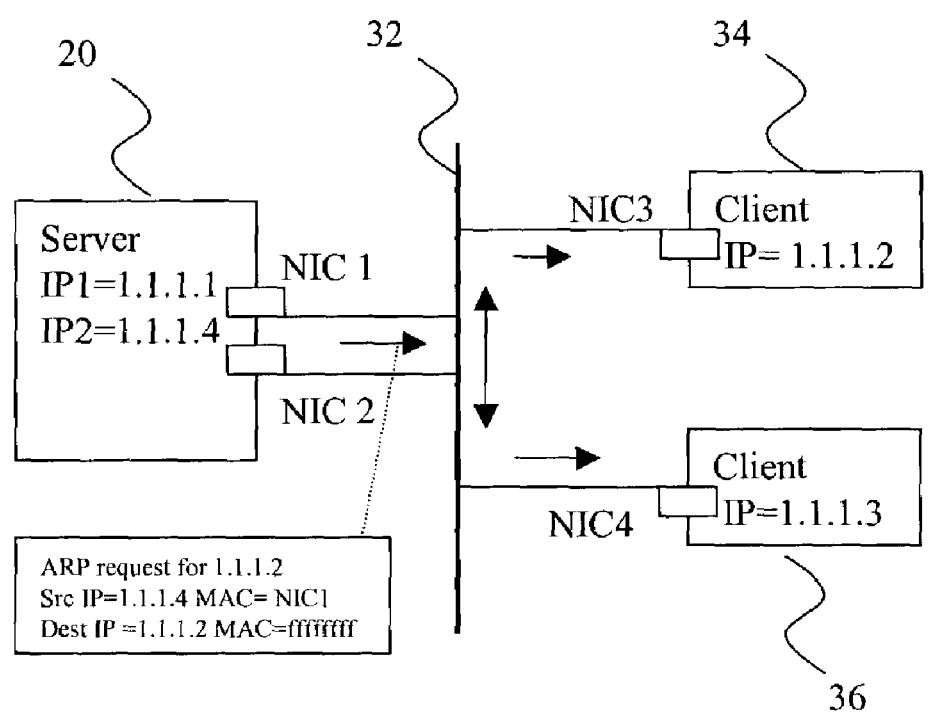
FIG. 8 illustrates an exemplary data flow of a broadcast request pursuant to the method of FIG. 3.

Referring now to FIG. 8 and step 50 of FIG. 3, to avoid this disruption of inbound traffic balancing without making changes to the clients or ARP process, the two server IP addresses of the server 20 are configured so that normal client communications occur via the first IP address (e.g., 1.1.1.1), while the second server address 1.1.1.4 is used to send out ARP requests. Continuing the previous example where the entry for the client 34 in the server 20's ARP table has expired, the server 20 may send an ARP Request for IP address 1.1.1.2 at time t+Dt1 using the IP address 1.1.1.4 and MAC address NIC1. However, because the clients' ARP tables have the first IP address (1.1.1.1) and the ARP request generated by the server uses the second IP address (1.1.1.4), the clients' ARP entries for the server 20's IP address will not match the ARP request. Because the addresses do not match, the clients will not update their ARP tables after receiving the address request, as illustrated in Tables 11 and 12.

TABLE 11

(Client 34)

| IP Address | MAC Address | Lifetime | Status |
|---|---|---|---|
| 1.1.1.1 | NIC1 | T1 – Dt1 | Valid |

TABLE 12

(Client 36)

| IP Address | MAC Address | Lifetime | Status |
|---|---|---|---|
| 1.1.1.1 | NIC2 | T2 – Dt1 | Valid |

Accordingly, the server 20 may obtain addresses of the clients 34, 36 without disrupting the load balance of incoming traffic.

While the preceding description shows and describes one or more embodiments, it will be understood by those skilled in the art that various changes in form and detail may be made therein without departing from the spirit and scope of the present disclosure. For example, the type of addressing used in the preceding description may vary, and it is understood that substitutions may be made, such as replacing a MAC address with an Ethernet address. Similarly, different network configurations may be used for different types of digital devices. Furthermore, it is understood that multiple network addresses may be assigned to handle inbound and outbound communications, just as multiple hardware numbers may be assigned. Therefore, the claims should be interpreted in a broad manner, consistent with the present disclosure.

What is claimed is:

1. A method for balancing an incoming traffic load on a server that uses an address resolution protocol (ARP) for address resolution with first and second clients, wherein the server includes at least first and second links, and is associated with first and second internet protocol (IP) addresses, and wherein the server communicates with the first client via the first link and the first IP address, and communicates with the second client via the second link and the first IP address, the method comprising:
   determining that a third IP address has expired on the server, wherein the third IP address is associated with the first client; and
   broadcasting an ARP request by the server for the first client via the second IP address, wherein the second client continues to send packets to the server via the first IP address and the second link after receiving the broadcast ARP request, because the second client does not relate the second IP address with the server.

2. The method of claim 1 wherein the first and second links are first and second network interface cards, respectively.

3. The method of claim 1 further comprising:
   storing the third address on the server; and
   monitoring the third address to determine whether it is expired.

4. The method of claim 1 further comprising sending the first address to the first or second client in response to a client ARP request, and withholding the second address from the first and second clients when responding to the ARP request, so that the first and second clients do not associate the second address with the server.

5. A method for balancing an incoming traffic load on a computer, wherein the computer includes first and second data paths, and is associated with first and second addresses, and wherein the computer communicates with a first client via the first address and the first data path, and communicates with a second client via the first address and the second data path, the method comprising:

storing a third address, wherein the third address is associated with the first client;

determining that the stored third address has expired; and broadcasting an address request by the computer for the first client via the second address and the first path, wherein the second client continues to send packets to the computer via the first address and the second data path after receiving the broadcast request, because the second client does not relate the second address with the computer.

6. The method of claim 5 wherein the third address is stored for a predefined amount of time, and wherein determining that the third address has expired includes determining that the predefined amount of time has elapsed.

7. The method of claim 5 further comprising updating the computer with a current address received by the computer in response to the broadcast address request, wherein the current address is associated with the first client.

8. The method of claim 5 further comprising associating the first and the second data paths with first and second identifiers, respectively.

9. The method of claim 8 wherein the first and second identifiers are media access control addresses corresponding to first and second network interface cards, respectively.

10. The method of claim 5 further comprising:
receiving a request from a third client by the computer;
making a load balancing decision to determine whether to assign the third client the first or the second data path; and
assigning the first address and the first or the second data path to the third client based on the decision.

11. The method of claim 10 wherein the load balancing decision is based on an incoming traffic load of the first and the second data paths.

12. The method of claim 5 further comprising assigning the first address to the first and second clients, and withholding the second address from the first and second clients, so that the first and second clients do not associate the second address with the computer.

13. The method of claim 5 wherein the request is an address resolution protocol message.

14. A method for managing a traffic load on a server, wherein the server
includes first and second identifiers and is associated with first and second network addresses for communicating with first and second clients, the method comprising:
establishing a first communications link between the server and the first client using the first address and the first identifier, and a second communications link between the server and the second client using the first address and the second identifier;
sending a request for a current address associated with the first client from the server to the first and second clients via the second address; and
continuing to use the second link for communications between the server and the second client after the second client receives the request.

15. The method of claim 14 wherein continuing to use the second link includes not updating the second identifier with the first identifier in the second client.

16. The method of claim 14 further comprising determining that a location entry containing a third address associated with the first client has expired, wherein sending the request for the current address occurs following the expiration of the location entry.

17. The method of claim 14 further comprising:
receiving the request by the second client, wherein the request includes the second address and the first identifier; and
determining that the second address of the received request does not match the first address of the second link, wherein the continued use of the second link between the server and the second client is based on the determination that the first and second addresses do not match.

18. A method for maintaining a load balance in a computer network, the method comprising:
assigning one of a plurality of data routes associated with a first address and a server to each of a plurality of clients, wherein the assigned route is used for communications between the server and each of the clients;
identifying a second address associated with the server, wherein the second address is for broadcasting an address request to the clients via one of the routes; and
broadcasting the address request when a current address of one of the clients expires, wherein each of the clients will continue communicating with the server via their assigned route rather than switching to the route used in broadcasting the request.

19. The method of claim 18 further comprising:
storing a location entry, wherein the entry identifies a client address associated with the one of the clients; and
monitoring the stored entry to determine when the entry expires, wherein the address request is broadcast after the entry expires.

20. The method of claim 18 further comprising:
comparing the first address to the second address to determine if they match;
replacing the assigned route of each of the clients with the route used in broadcasting the request if a match occurs; and
continuing communications between the server and each of the clients using the assigned routes if no match occurs.

21. A system for maintaining an incoming traffic load balance, the system comprising:
first and second network addresses associated with a computer; and
the computer comprising:
a first processor;
first and second data interfaces for connecting the first processor to first and second clients; and
a first memory accessible to the first processor for storing instructions, the first memory containing instructions for:
balancing the incoming traffic load by communicating with the first client via the first network address and the first interface, and communicating with the second client via the first network address and the second interface;
determining that a location entry associated with the first client and stored in the first memory has expired; and
broadcasting an address request to the first and second clients via the second network address and the first interface, wherein the traffic load will remain balanced because the second client will not automatically begin communicating with the computer via the first interface after receiving the request.

22. The system of claim 21 wherein the second client comprises a second processor and a second memory accessible to the second processor for storing instructions for execution by the second processor, wherein the instructions are for:
  receiving the broadcast address request;
  comparing the second network address with the first network address to determine if the first and second network addresses are identical;
  communicating with the computer via the first interface if the first and second network addresses are identical; and
  communicating with the computer via the second interface if the first and second network addresses are not identical.

23. The system of claim 21 wherein the first and second data interfaces comprise first and second hardware components, respectively, and wherein the first and second hardware components are identified by first and second unique identification numbers.

24. The system of claim 21 wherein the computer and the clients are operable to communicate using an address resolution protocol (ARP), and wherein the address request is an ARP message.

* * * * *